US008042721B2

(12) United States Patent
Maropis

(10) Patent No.: US 8,042,721 B2
(45) Date of Patent: Oct. 25, 2011

(54) ULTRASONIC DEVICE HAVING EXPONENTIAL HORN SLEEVE PORTION

(76) Inventor: Nicholas Maropis, Baden, PA (US)

( * ) Notice: Subject to any disclaimer, the term of this patent is extended or adjusted under 35 U.S.C. 154(b) by 255 days.

(21) Appl. No.: 12/157,636

(22) Filed: Jun. 12, 2008

(65) Prior Publication Data
US 2009/0308910 A1 Dec. 17, 2009

(51) Int. Cl.
*B23K 1/06* (2006.01)
(52) U.S. Cl. .................... 228/1.1; 228/110.1; 228/111
(58) Field of Classification Search ............ 228/1.1, 228/110.1, 111
See application file for complete search history.

(56) References Cited

U.S. PATENT DOCUMENTS

| 2,651,148 A | * | 9/1953 | Carwile | 451/165 |
| 2,891,179 A | | 6/1959 | Elmore | 310/26 |
| 3,283,182 A | | 11/1966 | Jones et al. | 310/8.7 |
| 5,364,005 A | * | 11/1994 | Whelan et al. | 228/1.1 |
| 6,596,229 B2 | * | 7/2003 | Lin et al. | 420/502 |

* cited by examiner

*Primary Examiner* — Kiley Stoner
*Assistant Examiner* — Erin Saad
(74) *Attorney, Agent, or Firm* — Drinker Biddle & Reath LLP

(57) ABSTRACT

An ultrasonic device includes a coupler, a mounting sleeve and an exponential horn form by both the coupler and the mounting sleeve. A flange is located on the mounting sleeve for support at a node of minimum vibratory motion. The mounting sleeve and coupler are formed separately and then metallurgically attached so they vibrate together as a substantially unitary member. The formation of the horn by the two components in this manner allows the diameter at the start of the horn to be increased to the outer diameter of the mounting sleeve, thereby increasing cross-sectional area at the horn start and increasing amplitude at the horn tip. Preferably, the coupler and mounting sleeve are made from stainless steel alloy and attached using a silver braze alloy. The device may also include a support collar attached to the mounting sleeve flange to support the mounting sleeve and primary coupler.

16 Claims, 3 Drawing Sheets

ULTRASONIC DEVICE HAVING EXPONENTIAL HORN SLEEVE PORTION

FIELD OF THE INVENTION

This invention relates generally to ultrasonic vibratory devices, and more particularly to an ultrasonic vibratory device having a coupler and a mounting sleeve.

BACKGROUND

Ultrasonic vibratory devices are used for a variety of applications including, for example, tube drawing, soldering, welding, drilling, machining, and mixing. Ultrasonic vibratory devices typically include a source of vibratory energy (e.g., a transducer creating mechanical oscillation) and a coupler. The coupler conducts the vibratory energy from the transducer to a desired area or to a work piece attached to the coupler. Ultrasonic vibratory devices are generally supported in mounts from a work table or other support surface.

An important material property affecting the vibratory characteristics of ultrasonic vibratory devices is the speed of sound, which relates to the speed at which an energy wave passes through a bar of material. The speed of sound in a material is equal to $<c=\sqrt{E/\rho}$, where E is Young's modulus and p is the density of the material. The speed of sound will generally vary to some extent for any given material because of variations in material chemistry, heat treatment, or amount of cold work.

During the operation of an ultrasonic vibratory device, a standing wave pattern will be established. The particular pattern depends on the operating frequency for the device and on the sound properties of the materials used. The wave pattern in the operating device defines node locations, which are those locations at which vibratory motion is at a minimum. Placement of the support for the device at the node locations desirably limits energy losses associated by absorption of the energy by the support.

U.S. Pat. No. 2,891,179 (Elmore) describes a support system for an ultrasonic vibratory device. The Elmore device includes a coupler having a length that is equal to a multiple of one-half wavelengths according to the sound properties of the material and the operating frequency of the device. The coupler includes a tapered horn at its working end. The taper of the Elmore horn is not linear and, instead, is curved as an exponential function of length. While other geometric shapes can be used, the exponential geometry does not introduce a reactive component into the impedance of the system and hence is preferred.

The Elmore device includes a support for the coupler that renders the associated vibratory device substantially force-insensitive regardless of the location on the device to which the support is secured. In other words, the vibratory device may be applied to a work area under a load without a significant shift in frequency for the device. The support structure for the Elmore device has become known in the art as an "Elmore mount" or more simply as an "E-mount".

The Elmore mount has a length that is equivalent to one-half wavelength. For devices having very long transducer-coupler arrays, the length may be a multiple of one-half wavelengths. Referring to U.S. Pat. No. 2,891,179, the Elmore mount (FIG. 1) includes axially-extending resonant members (inner rods 36a, 36b, outer rods 44a, 44b) and connecting flanges (40a, 40b) joined to the resonant members. The connecting flanges are joined to the resonant members at a length from the free end of each resonant member that is equivalent to one-quarter wavelength of operating frequency (or an odd multiple of one-quarter wavelengths).

In later variations, the Elmore mount included a mounting sleeve extending longitudinally along the coupler of the ultrasonic device with a nodal flange included on the sleeve adapted for attachment to a support member, such as a support collar for example.

Ultrasonic devices designed to vibrate in a longitudinal mode that are not perfectly matched to an applied load experience an associated radial motion and amplitude due to Poisson's ratio. For the relatively low power applications for which the Elmore device was initially intended (e.g., welding units having maximum power of 50 watts), the associated radial effects could be neglected. However, the associated radial motion and amplitude due to Poisson's ratio creates support problems in higher power applications (e.g. metal tube drawing applications having 1000 watt power requirements).

SUMMARY OF THE INVENTION

The present improvement provides an ultrasonic device adapted for higher power applications, such as metal tube drawing. The ultrasonic device comprises a primary coupler, a mounting sleeve housing a portion of the primary coupler, and an exponential horn formed in part by the primary coupler and in part by the mounting sleeve. The mounting sleeve is formed separately from the primary coupler and secured to the primary coupler such that the primary coupler and the mounting sleeve vibrate together as a substantially unitary member. The combination of components in this manner to collectively define the exponential horn of the device allows the diameter of the horn at the start of the horn to be increased to be equivalent to the outer diameter of the sleeve. Such increase in diameter increases the cross sectional area at the start of the exponential horn, thereby increasing the vibratory amplitude at the opposite tip end of the horn of the exponential horn. The ultrasonic device includes a flange located on the mounting sleeve for supporting the mounting sleeve at a node of minimum vibratory motion such that vibratory energy losses are minimized.

According to one embodiment, the primary coupler and mounting sleeve are metal and are bonded together metallurgically by brazing. According to one preferred embodiment, the primary coupler and mounting sleeve are made from a stainless steel alloy and the brazing material is a silver braze alloy. Alternatively, high temperature copper braze bonding performed in a high vacuum or in a hydrogen atmosphere can be used to achieve the bond.

The materials selected for the primary coupler and the mounting sleeve may be different materials. If different materials are selected, however, it is preferable that the material property of the speed of sound through the materials is approximately equal.

The device may also include a support collar for supporting the mounting sleeve and primary coupler. The support collar is attached to the flange on the mounting sleeve. According to one embodiment, an annular gap is defined between the mounting sleeve and the support collar extending axially from the flange towards the exponential horn of the device.

BRIEF DESCRIPTION OF THE DRAWINGS

For the purpose of illustrating the invention, the drawings show a form of the invention that is presently preferred.

However, it should be understood that this invention is not limited to the precise arrangements and instrumentalities shown.

DETAILED DESCRIPTION OF THE DRAWINGS

Figure 1:
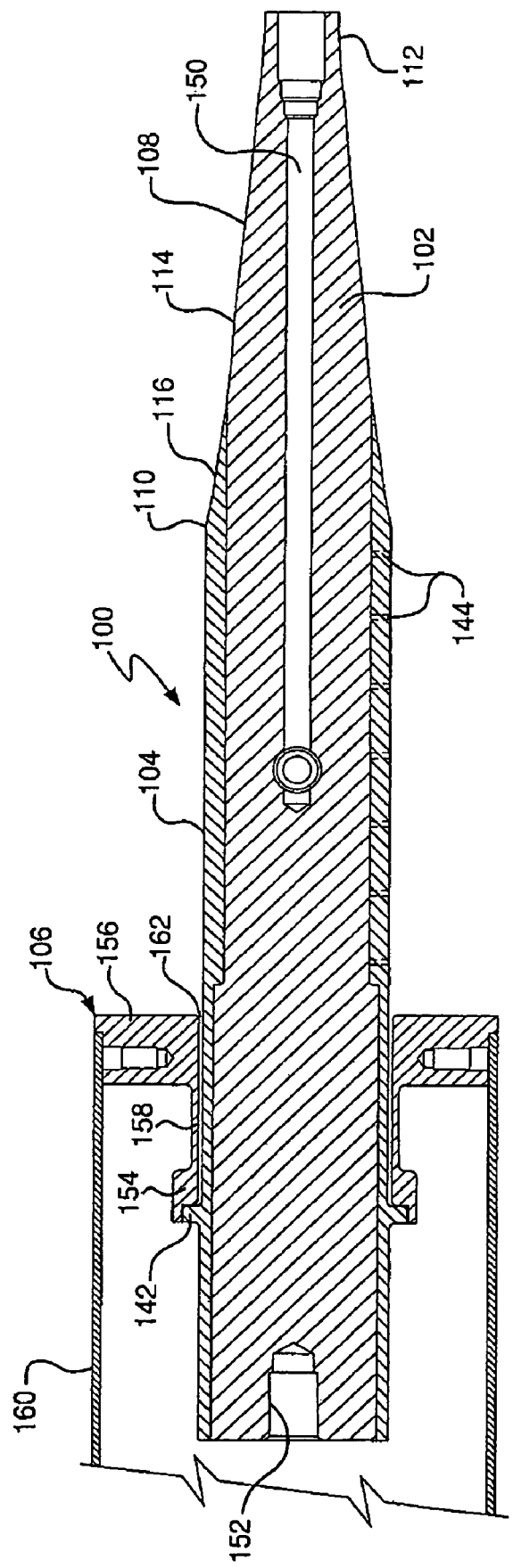
FIG. 1 is a side elevation view, in section, of an ultrasonic device according to an exemplary embodiment of the invention having a coupler, mounting sleeve and support collar.

Referring to the drawings where like numerals identify like elements, there is shown in the sectional view of FIG. 1 an ultrasonic device 100 according to an exemplary embodiment of the invention. The ultrasonic device 100 includes a primary coupler 102, a mounting sleeve 104, and a support collar 106. The ultrasonic device 100 includes an exponential horn 108 located at a forward end of the device 100. As shown in FIG. 1, the exponential horn 108 defines an outer surface that reduces in size along its length from a maximum diameter at a rearward end 110 of the horn to a minimum diameter adjacent a tip 112 of the horn. As is also shown in FIG. 1, the exponential horn 108 is defined by multiple components of the device 100 having a forwardly-located portion 114 defined by the primary coupler 102 and a rearwardly-located portion 116 defined by the mounting sleeve 104. The ultrasonic device of the present invention is particularly adapted to high power applications in which large loading may be applied to the device (e.g., metal tube drawing process under approximately 6000 pound loading). The present application is not limited to any particular operating frequencies. However, according to one preferred embodiment, the operating frequency is approximately 15,000 Hertz.

As will be described in more detail below, the primary coupler 102 and the mounting sleeve 104 are formed separately from each other but are bonded to each other, preferably metallurgically by silver brazing or copper brazing, such that the two components vibrate as a substantially unitary member. The attachment of the components in this manner provides for a dramatic increase in the potential diameter of the horn compared to prior ultrasonic mounting systems in which the primary coupler housed within the mounting sleeve was a separate component. By combining the components in accordance with the present invention, the sleeve can be used to define part of the horn thereby increasing the potential diameter of the horn to the outer diameter of the sleeve. As should be understood by those skilled in the art, the increase in diameter of the horn increases the cross sectional area at the start of the exponential horn, thereby increasing the vibratory amplitude at the tip 112 of the horn.

Figure 2:
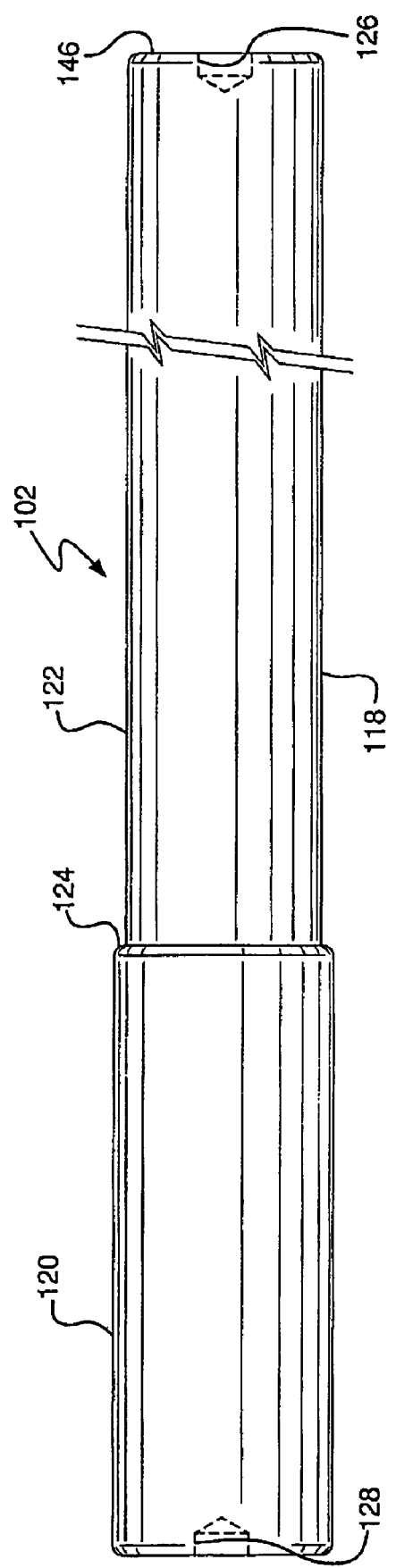
FIG. 2 is a side elevation view of a primary coupler rod from which the primary coupler of FIG. 1 is formed, with the primary coupler rod being shown separately from the mounting sleeve prior to attachment to the mounting sleeve.
Figure 3:
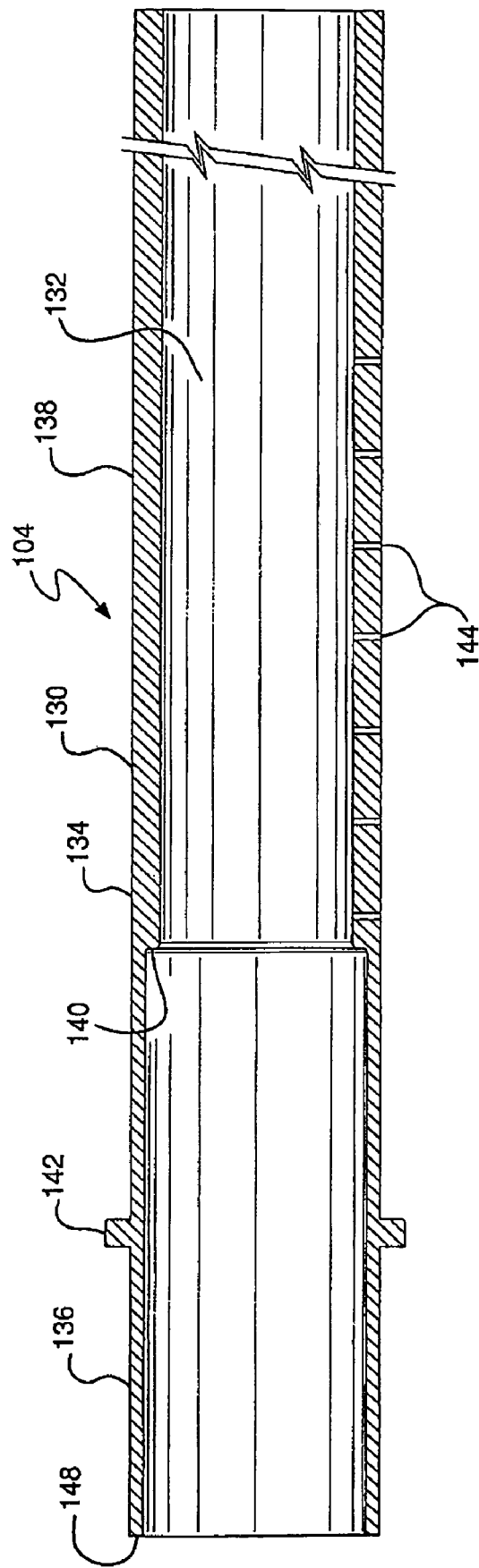
FIG. 3 is a side elevation view of a tubular sleeve member from which the mounting sleeve of FIG. 1 is formed, with the tubular sleeve member being shown separately prior to assembly with the primary coupler rod of FIG. 2.

The primary coupler 102 and the mounting sleeve 104 of the ultrasonic device 100 are shown separately in the side elevation view of FIG. 2 and the sectional view of FIG. 3. The primary coupler 102 and mounting sleeve 104 are depicted in FIGS. 2 and 3 prior to the process of making the ultrasonic device 100 in the manner described below. The primary coupler 102 is formed from a substantially solid rod 118 of material having first and second parts 120 and 122. As shown, the diameter of the first rod part 120 is greater than the diameter of the second rod part 122, such that an annular shoulder 124 is defined at the juncture between the first and second parts 120, 122. Referring to FIG. 2, the primary coupler rod 118 includes central bores 126, 128 respectively located at forward and rearward ends of the rod 118 to facilitate handling of the rod during the process of making the ultrasonic device 100.

Referring to FIG. 3, the mounting sleeve 104 is formed from a tubular sleeve member 130 defining a hollow interior 132 for receiving the primary coupler rod 118. The tubular sleeve member 130 has an outer surface 134 of substantially uniform diameter along the length of the tubular sleeve member 130. The tubular sleeve member 130 includes first and second parts 136, 138. As shown, the first part 136 has an inner surface having a diameter that is greater than the diameter of the inner surface of the second part 138 such that an annular ledge 140 is defined at the juncture between the first and second parts 136, 138 of tubular sleeve member 130. The tubular sleeve member 130 includes a flange 142 defined on the outer surface of first part 136 for supporting the mounting sleeve 104 and the primary coupler 102 of the device 100 as described below. The tubular sleeve member 130 also includes a plurality of apertures 144 defined by the second part 138 of the tubular sleeve member 130. The apertures 144 extend through the tubular sleeve member 130 to communicate with the hollow interior 132. As will be described below, the apertures 144 form injection ports for placement of a brazing material between the primary coupler rod 118 and the tubular sleeve member 130 as part of the manufacturing process of the ultrasonic device.

The primary coupler rod 118 is adapted for placement within the interior 132 of the tubular sleeve member 130 by sliding the forward end 146 of the rod 118 into the rearward end 148 of tubular sleeve member 130 so that the annular shoulder 124 of rod 118 contacts the annular ledge 140 of tubular sleeve member 130, as shown in FIG. 1. Preferably, the first and second parts 120, 122 of primary coupler rod 118 have respective lengths that are substantially equal to those of the first and second parts 136, 138 of tubular sleeve member 130 such that the coupler rod 118 is housed within the interior 132 of tubular sleeve member 130 along substantially the entire length of the coupler rod 118. Preferably, the overall length of the primary coupler rod 118 and tubular sleeve member 130 assembly is equivalent to three times the one-half wavelength half according to the operating frequency and the velocity of sound in the components. A slight amount of length may be added to allow for final adjustments to be made in case of material variations.

As discussed above, the primary coupler rod 118 and tubular sleeve member 130 are attached to each other during the manufacturing process so that the combined components will vibrate together as a substantially unitary member. Preferably, the primary coupler rod 118 and tubular sleeve member 130 are both made from a metal. According to one preferred embodiment, the primary coupler rod 118 and tubular sleeve member 130 are both made from a stainless steel alloy. It should be understood, however, that it is not a requirement of the invention that the primary coupler rod 118 and tubular sleeve member 130 be made from the same material. However, in the event that different materials were to be used, it would be preferable that the material property of velocity of sound for the two materials be substantially equal. Preferably, the primary coupler rod 118 and tubular sleeve member 130 are tested prior to assembly to measure the velocity of sound through each component. The measurement of the velocity of sound for the separate components provides for adjustments to be made to the configuration of the exponential horn 108 to account for material variations. Preferably, the velocity of sound is also measured after attachment of the primary coupler rod 118 and tubular sleeve member 130 and prior to machining. This final test of velocity of sound through the attached components provides for a more absolute determination regarding the configuration of the horn 108 to be machined in order to achieve optimal performance for the resulting device 100.

According to one preferred embodiment of the invention, the primary coupler rod 118 and tubular sleeve member 130 are attached to each other metallurgically. Preferably, the metallurgical attachment of the components is achieved by brazing. According to a preferred embodiment, the brazing material is a silver braze alloy. During this step of the manufacturing process, a compatible brazing material is injected through the injection ports 144 defined by tubular sleeve member 130 to place the brazing material between the inner surface of the tubular sleeve member 130 and the outer surface of the primary coupler rod 118. The assembly is then heated (e.g., in a brazing oven) to metallurgically attach the primary coupler rod 118 and tubular sleeve member 130 to each other. The invention is not limited to metallurgical attachment by brazing. Another process that results in an attachment between the components by which the components will vibrate together as a substantially unitary member could be used instead.

Following the above-described metallurgical attachment between the primary coupler rod 118 and the tubular sleeve member 130, the combined components are machined to form the primary coupler 102 and mounting sleeve 104 of FIG. 1. As discussed above, it is preferred that the metallurgically-attached components are tested a final time to measure the velocity of sound prior to the machining process. As shown, the machining process will result in the removal of a portion of the second part 138 of tubular sleeve member 130 such that the resulting mounting sleeve 104 is reduced in length compared to the primary coupler 102. According to one embodiment, the length of tubular sleeve member removed during the machining process is equivalent to approximately one-half wavelength for the operating device. As a result, the primary coupler 102 is not housed within the mounting sleeve interior 132 along the entire length of the primary coupler 102 and, instead, extends from the mounting sleeve 104. The machining process also removes a portion of the second part 122 of the primary coupler rod 118 to form the part of exponential horn 108 defined by the primary coupler 102. As shown, the amount of primary coupler rod 118 material that is removed increases along the length of the exposed portion of the primary coupler rod 118 towards the tip end 112 of horn 108. The diameter, however, does not reduce constantly along the length of the horn (i.e., the horn is not linearly tapered). Instead, the diameter is reduced in exponential fashion to form the desired shape of the horn 108.

The primary coupler rod 118 is also machined to define an elongated tool bore 150 in the resulting primary coupler 102. The tool bore 150 of the depicted device 100 extends rearwardly into the interior 132 of mounting sleeve 104 beyond the exponential horn 108. The tool bore 150 is adapted for attaching a tool or work piece for ultrasonic actuation of the tool or work piece by the device 100. As shown, a transducer bore 152 is also formed in the primary coupler 102 at the rearward end of the primary coupler 102. The transducer bore 152 is adapted for attachment of a transducer or other component for ultrasonically vibrating the primary coupler 102 and mounting sleeve 104 of device 100.

The assembly including the primary coupler 102 and the attached mounting sleeve 104 is supported by the support collar 106. As shown, the support collar 106 is attached to the flange 142 of mounting sleeve 104 such that the primary coupler/mounting sleeve assembly is supported adjacent the rearward end of the assembly. The support collar 106 includes a first ring 154 at a rearward end of the support collar and a larger second bulkhead ring 156 at a forward end. The support collar 106 includes an intermediate tubular portion 158 between the first and second rings 154, 156. The support of the mounting sleeve/primary coupler assembly resulting from the attachment of the support collar 106 to the flange 142 on the mounting sleeve 104 provides an E-mount support structure for the device 100. As such, the mounting sleeve/primary coupler assembly is supported at a node of minimum vibratory motion at operating frequency for the device 100 so as to minimize vibratory energy losses.

The first ring 154 of the support collar 106 is attached to the flange 142 of mounting sleeve 104 to secure the primary coupler/mounting sleeve assembly to the support collar 106. Preferably, first ring 154 is attached to the flange 142 by welding. The larger bulkhead ring 156 is adapted for attaching the support collar 106 to another support member, such as the support pipe 160 shown in FIG. 1. The bulkhead ring 156 includes holes for receiving threaded fasteners to secure the support collar 106 to the support pipe 160.

As shown, the rings 154, 156 and intermediate tubular portion 158 of the support collar 106 are dimensioned such that a narrow annular gap 162 is defined between an inner surface of the support collar 106 and an exterior surface of the mounting sleeve 104. The gap 162 extends axially along a portion of the mounting sleeve/primary coupler assembly forwardly from the flange 142 of mounting sleeve 104.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An ultrasonic device comprising:
  a primary coupler;
  a mounting sleeve housing a portion of the primary coupler;
  an exponential horn formed in part by the primary coupler and in part by the mounting sleeve, with the mounting sleeve formed separately from the primary coupler and secured to the primary coupler such that the primary coupler and the mounting sleeve vibrate together as a substantially unitary member, and wherein the part of the exponential horn formed by the mounting sleeve has a greater diameter than the part of the exponential horn formed by the primary coupler, and wherein the exponential horn defines an outer surface that reduces in size along its length from a maximum diameter at a rearward end of the horn to a minimum diameter adjacent a tip of the horn; and
  a flange located on the mounting sleeve for supporting the mounting, sleeve at a node of minimum vibratory motion such that vibratory energy losses are minimized, and wherein the mounting sleeve contacts the primary coupler at least from a first position on the exponential horn to a second position of the primary coupler where the flange is located.

2. The ultrasonic device of claim 1, wherein the primary coupler and the mounting sleeve are secured to each other by brazing.

3. The ultrasonic device of claim 2, wherein the brazing is achieved using a silver braze alloy.

4. The ultrasonic device of claim 1, wherein the primary coupler and the mounting sleeve are formed from the same material.

5. The ultrasonic device of claim 4, wherein the material is a stainless steel alloy.

6. The ultrasonic device of claim 1, wherein the primary coupler and the mounting sleeve are respectively made from a first material and a second material, with the velocity of sound property for the first material being substantially similar to the velocity of sound property thr the second material.

7. The ultrasonic device of claim 1 further comprising a support collar secured to the flange on the mounting sleeve to support the mounting sleeve and the primary coupler.

8. The ultrasonic device of claim 7, wherein an annular gap is defined between the mounting sleeve and the support collar and extending axially from the flange towards the exponential horn of the device.

9. An ultrasonic device comprising:
a substantially solid primary coupler;
a mounting sleeve formed separately from the primary coupler and defining an interior containing a portion of the primary coupler;
an exponential horn defined in part by the primary coupler and in part by the mounting sleeve, with each of the primary coupler and the mounting sleeve made from a metal, with the velocity of sound through the primary coupler being substantially similar to the velocity of sound through the mounting sleeve, and with the mounting sleeve and primary coupler metallurgically attached to each other so as to vibrate together as a substantially unitary member, and wherein the part of the exponential horn formed by the mounting sleeve has a greater diameter than the part of the exponential horn formed by the primary coupler; and
a flange located on the mounting sleeve for supporting the mounting sleeve at a node of minimum vibratory motion such that vibratory energy losses are limited, and wherein the mounting sleeve contacts the primary coupler at least from a first position on the exponential horn to a second position of the primary coupler where the flange is located.

10. The ultrasonic device of claim 9, wherein the mounting sleeve and primary coupler are metallurgically attached to each other by a brazing material placed between mounting sleeve and the primary coupler.

11. The ultrasonic device of claim 10, wherein the mounting sleeve and the primary coupler are both made from a stainless steel alloy.

12. The ultrasonic device of claim 10, wherein the brazing material is a silver braze alloy.

13. The ultrasonic device of claim 10, wherein the mounting sleeve defines a plurality of injection ports communicating with the interior of the mounting sleeve for injecting braze material between the primary coupler and the mounting sleeve.

14. The ultrasonic device of claim 9 further comprising a support collar for supporting the mounting sleeve and the primary coupler, the support collar secured to the flange on the mounting sleeve.

15. The ultrasonic device of claim 14, wherein an annular gap is defined between the mounting sleeve and the support collar, the annular gap extending axially from the flange of the mounting sleeve towards the exponential horn of the device.

16. The ultrasonic device of claim 1, wherein the flange is located on a portion of the mounting sleeve which is not part of the exponential horn.

* * * * *